Figure 1:
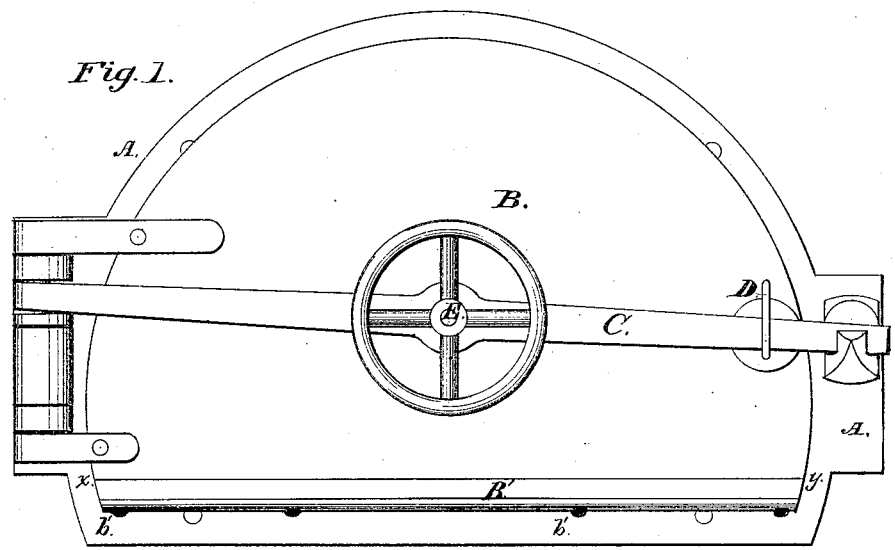

J. RICKETTS.
LIDS AND MOUTH-PIECES FOR GAS-RETORTS.

No. 179,221. Patented June 27, 1876.

Witnesses:
Henry E. Manning
William F. Hopson

Inventor:
James Ricketts
by George Derry,
Atty.

UNITED STATES PATENT OFFICE.

JAMES RICKETTS, OF GLASGOW, SCOTLAND.

IMPROVEMENT IN LIDS AND MOUTH-PIECES FOR GAS-RETORTS.

Specification forming part of Letters Patent No. 179,221, dated June 27, 1876; application filed March 3, 1876.

*To all whom it may concern:*

Be it known that I, JAMES RICKETTS, of Glasgow, Scotland, have invented new and useful Improvements in Lids and Mouth-Pieces for Gas-Retorts; and I do hereby declare the following to be a full, clear, and exact description of the invention, reference being had to the drawing accompanying and forming a part of this specification.

My invention relates to lids and mouth-pieces for closing gas-retorts; and consists in a D-shaped mouth-piece having a D-shaped projection or rib on its front side, extending around it near the periphery, and in a D-shaped lid having a D-shaped lip on its inside, extending near the periphery of the circular part, in combination with a straight piece having the lip secured to the lower edge of the lid, the D-shaped projection on the mouth-piece and the D-shaped lip on the lid forming a metallic joint for closing the retort, as is hereinafter more fully set forth and claimed.

Figure 2:
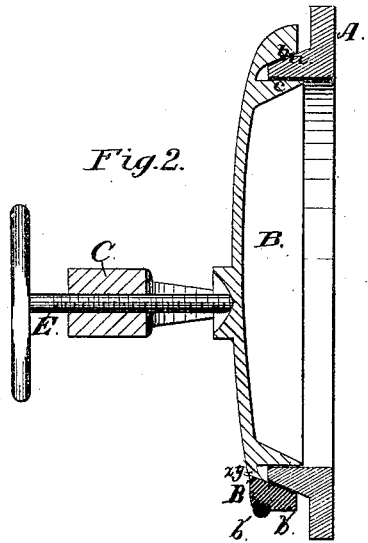

Figure 1 is a view of the closed lid and of the exterior portion of the mouth-piece. Fig. 2 is a transverse vertical section of the lid and mouth-piece, showing the lip, groove, and projecting rib.

The D-shaped mouth-piece A, Fig. 1, is made of cast metal, and is bolted to a flange on the gas-retort, any suitable lute intervening to make the joint gas-tight. It is made with a V-shaped and beveled projection in cross-section, *a*, on its front side, the curved part of which is circular, forming a little more than a semicircle. Thus shaped, the mouth-piece can be put in a lathe, and the front and beveled outside of the projection can be turned and nicely finished, while the straight part of the projection can be equally well finished on a planer. The D-shaped lid B is also made of cast metal, and in two parts—B, the main part, and B′ the straight part secured thereto—the line of junction of the two parts being indicated in both figures by line *x y*. The outer edge of the lid projects on its inside, and forms a D-shaped lip, *b*, the curved part of which is circular in form. The straight part of the lip *b* and of the lid (indicated by B′) forms one part of the lid, and the circular portion of the lid B the other part. The parts of the lid being thus made, the circular part can be put in a lathe, and the beveled inside of the lip be turned and formed to fit over the curved projection *a* on the mouth-piece A, while the straight part can be finished on a planer and secured to the circular part by screws *b′*. The two parts being thus made and united, the projecting lip *b* on the lid is adapted to close over the projection *a* on the mouth-piece A, and form a metallic joint. The projection *c* on the inside of the lid corresponds in its outline with the lip *b*, and shuts within the opening in the mouth-piece. Its office is to exclude dirt and tarry matter from the metallic joint.

In both figures the lid and mouth-piece are represented as hinged together. One end of the cotter-bar C is also represented in Fig. 1 as hinged, while the other end rests on an arm attached to the lid. A catch, D, on the mouth-piece is shown in Fig. 1, to hold one end of the cotter-bar. The lid and cotter-bar being thus loosely hinged and held, the screw E in the central portion of the cotter-bar forces the lid home, and the lip *b* on the inside of the lid, in connection with the projection *a* on the mouth-piece, forms a gas-tight metallic joint. The lid and cotter-bar may be otherwise arranged in any of the modes known to those skilled in the art.

I claim as my invention—

1. A D-shaped lid, made in two parts, the main part B, provided with a D-shaped projection, *b*, the curved part of which is circular in form, and the straight part B′, screwed to the under edge of the main part, as and for the purpose described.

2. A D-shaped lid, made in two parts, the main part B provided with a D-shaped projection, *b*, the curved part of which is circular in form, and the straight part B′, screwed to the under edge of the main part, in combination with the D-shaped mouth-piece A, having a D-shaped projection, *a*, the curved part of which is circular in form, substantially as set forth.

JAMES RICKETTS.

Witnesses:
GEORGE TERRY,
THOMAS NESS.